United States Patent [19]

Barton, Jr.

[11] 4,190,109
[45] Feb. 26, 1980

[54] INTRODUCTION AND SELECTIVE REMOVAL OF DEBILITATING AGENT FOR PERMEABILITY CORRECTION

[75] Inventor: Hugh M. Barton, Jr., Bartlesville, Okla.

[73] Assignee: Phillips Petroleum Company, Bartlesville, Okla.

[21] Appl. No.: 950,752

[22] Filed: Oct. 11, 1978

[51] Int. Cl.$^2$ .................... E21B 33/138; E21B 43/22
[52] U.S. Cl. .................................. 166/270; 166/273; 166/292; 166/294; 166/295; 166/300
[58] Field of Search ............... 166/270, 271, 273, 274, 166/292, 294, 295, 300, 305 R, 307

[56] References Cited

U.S. PATENT DOCUMENTS

| | | | |
|---|---|---|---|
| 2,774,740 | 12/1956 | Magram | 166/300 UX |
| 3,396,790 | 8/1958 | Eaton | 166/270 |
| 3,490,533 | 1/1970 | McLaughlin | 166/270 |
| 3,500,926 | 3/1970 | Richardson | 166/300 X |
| 3,581,824 | 6/1971 | Hurd | 166/270 |
| 3,603,397 | 9/1971 | Peray | 166/270 |
| 3,654,993 | 4/1972 | Smith et al. | 166/300 X |
| 3,757,863 | 9/1973 | Clampitt et al. | 166/270 |
| 3,771,599 | 11/1973 | Buce | 166/295 |
| 3,815,681 | 6/1974 | Richardson | 166/281 |
| 3,827,977 | 8/1974 | Miles et al. | 166/300 X |

Primary Examiner—Stephen J. Novosad
Assistant Examiner—George A. Suchfield

[57] ABSTRACT

A debilitating agent is injected into a subterranean formation under conditions of time and injection rates such that it permeates both the more permeable zones and the less permeable zones. A flush is then injected under conditions of time and rate so as to selectively remove the debilitating agent from the more permeable zones. In one embodiment the debilitating agent is a polymerization inhibitor or poison. Then a material which will polymerize in the absence of the poison or inhibitor is injected. Since the poison or inhibitor will remain in the less permeable zones, little or no polymer is formed there. In the more permeable zones from which the poison has been flushed, polymerization occurs so that subsequently injected secondary or tertiary oil recovery fluids are diverted away from the thief zones to more effectively displace the oil from the less permeable zones. In another aspect of this embodiment, the debilitating agent is an inhibitor or poison for a reaction other than polymerization which forms a solid precipitate or other permeability-reducing plug. Alternatively, the debilitating agent is a depolymerization agent or a decomposition agent which will effect depolymerization of a polymer or decomposition of a chemical compound. The selective plugging then occurs as a result of the fact that the material causing breakdown of the injected polymer or chemical compound is absent in the more permeable zones as a result of the flush.

12 Claims, No Drawings

INTRODUCTION AND SELECTIVE REMOVAL OF DEBILITATING AGENT FOR PERMEABILITY CORRECTION

BACKGROUND OF THE INVENTION

In secondary or tertiary oil recovery operations, recovery of oil is maximized if the driven fluid is permitted to build up in a wide bank in front of the driving fluid which moves uniformly toward a producing well. To keep this bank of oil intact, and moving toward a producing well, a substantially uniform permeability must exist throughout the strata. If this uniform permeability does not exist, and it generally does not, the flooding will seek the areas of high permeability, and channeling occurs with the appearance of excess driving fluid at the producing well. Moreover, as the more permeable strata are depleted, the driving fluid has a tendency to follow these channels and further increase water production as reflected in an increased water/oil ratio to the point that the process becomes economically undesirable.

It is known in the art that more uniform flood fronts can be obtained in formations of nonuniform permeability by control or permeability correction of the more permeable strata of the formation. A number of methods for reducing the permeability of these permeable strata have been proposed, including the injection of plugging materials into these strata which at least partially plug the permeable zones so as to achieve more uniform permeability. Some of these methods of permeability correction accomplish the plugging step by the in situ formation of plugging material in the formation by the injection of one or more reactant substances which chemically react to form a solid residue. These reactant substances include various hydraulic cements, precipitate-forming materials, and monomers or prepolymers which are polymerizable under formation conditions. Unfortunately, however, these plugging materials can also plug less permeable zones. Particularly with the polymerizable materials which may be relatively fluid when injected, the situation can even be made worse by completely shutting off the already less permeable zones.

SUMMARY OF THE INVENTION

It is an object of this invention to selectively plug high permeability zones in a subterranean formation; and It is a further object of this invention to increase sweep efficiency of a secondary or tertiary oil recovery operation.

In accordance with this invention, a debilitating agent is introduced into the formation under conditions designed to allow permeation of the debilitating agent into both the more permeable zones and less permeable zones followed by a flush which selectively removes the debilitating agent from the more permeable zones after which a material is introduced which forms a fluid diversion plug in the absence of the debilitating agent.

DESCRIPTION OF THE PREFERRED EMBODIMENTS

The invention is applicable to any situation wherein it is desired to selectively plug the more permeable zones in a subterranean formation. Primarily, the invention is directed to the selective plugging of more permeable zones known as thief zones to improve the sweep efficiency of tertiary or secondary oil recovery processes.

The preferred plug forming materials of this invention are polymerizable monomers. Accordingly, the invention preferably involves injecting into the formation a polymerization poison or inhibitor for the particular monomer to be polymerized. For instance, materials such as potassium ferricyanide, hydroquinone and the like may be injected into the formation. These are known inhibitors for the polymerization of monomer systems such as: acrylamide and acrylic acid; acrylonitrile and acrylic acid; acrylonitrile and sodium styrene sulfonate; acrylic acid, and methacrylic acid; and acrylic acid with diallylamine. Examples of polymerization catalysts for the above systems are organic peroxides such as tert-butyl hydroperoxide, di(tert-butyl)-peroxide, and methyl ethyl ketone peroxide as well as inorganic peroxides such as ammonium persulfate. Also, various accelerators may be included with the catalyst system such as N,N-dimethylaniline and beta-dimethylaminopropionitrile.

Poisons such as p-benzoquinone which are known poisons for formation of popcorn polymer as disclosed in U.S. Pat. No. 3,771,599, the disclosure of which is hereby incorporated by reference can be injected followed by the injection of the monomer system.

Other polymerization inhibitors useful in this invention include chloranil and aromatic nitro compounds such as nitrobenzene, 2,4-dinitrochlorobenzene, o-nitrophenol, m-dinitrobenzene, picric acide, naphtha lene picrate and the like.

in addition to the formation of material strictly classified as polymers, the invention also encompasses the injection of a poison or inhibitor for any two substances that tend to react to form a solid in the presence of a catalyst or the presence of each other, or in the presence of materials inherent in the reservoir which act as catalysts. For instance, an acid can be introduced and allowed to permeate substantially the entire formation, after which the acid is flushed from the more permeable zones. Then a base such as NaOH added and $MgCl_2$ is added which forms a $Mg(OH)_2$ precipitate in the more permeable zones but does not do so, or does so to a lesser extent in the less permeable zones, because the acid neutralizes the base. Forming such precipitates for other reasons is shown in U.S. Pat. No. 3,871,452 and U.S. Pat. No. 3,414,053, the disclosures of which are hereby incorporated by reference.

Alternatively, the initial injection can be that of a material which causes depolymerization or decomposition or otherwise reduces the viscosity wherein the subsequent injection would be that of a polymer or other chemical compound formed above ground.

As a general proposition in heterogeneous systems, more than one pore volume of fluid is required to completely displace the connate fluids because higher permeability zones tend to accept the injected medium first, and thus an excess is required to permeate the less permeable zones. Consequently, a larger pore volume of the debilitating agent, i.e. poison or inhibitor will be injected as compared with the subsequent injection of the flush. For instance, more than one pore volume of retarder (1.1 to 10 preferably 1.5 to 3, for instance) or poison may be injected followed by less than one pore volume (0.1 to 0.9, preferably 0.25 to 0.75, for instance) of the flush. Thereafter this is followed by the monomer which would generally be employed in amounts similar to that utilized for the flush, although lesser or greater amounts can also be used.

Following the injection of the monomer and whatever induction time is required for plugging to occur, normal secondary or tertiary operations are then employed. For instance, a surfactant system may be injected and thereafter a mobility buffer, followed by a drive fluid as is known in the art, or conventional water flooding can be injected immediately after a selective plugging operation is complete. In either case, with the more permeable zones selectively plugged there is formed a more uniform bank of oil which is driven from the injection well or wells toward the recovery well or wells where it is produced. The invention is also applicable to other utilities where it is desired to achieve a more uniform permeability in a subterranean formation.

Calculated Illustrative Embodiment

Two pore volumes of a one weight percent aqueous solution of potassium ferricyanide is introduced through an injection well into an oil bearing formation which has been subjected to secondary water flooding operations until the ratio of water to oil in the production wells has become greater than 100:1 due to channeling of the water flood fluid through the more permeable zones. Thereafter, the formation is flushed with 0.5 pore volume of water containing 15,000 parts per million total dissolved solids which are primarily sodium chloride so as to remove the potassium ferricyanide from the more permeable zones without removing same from the less permeable zones. Thereafter there is injected a composition comprising 97 parts by weight water, 3 parts by weight acrylamide, 2 parts by weight sodium bicarbonate, 0.0075 part by weight methylene bisacrylamide, 0.0025 part by weight cobalt acetate, 0.1 part by weight disodium salt of ethylenediamine tetracetic acid, and 0.125 part by weight of a 70 percent tertiary butyl hydroperoxide/30 percent ditertiary butyl hydroperoxide mixture. After about a 4 hour latent time a normal tertiary oil recovery process is begun. First, a surfactant system comprising 3.1 percent of a petroleum sulfonate having an equivalent weight of 407, 3 percent isopropanol, 1.7 percent oil and 92 percent fresh water containing 15,000 parts per million NaCl is introduced in the amount of about 0.1 pore volume. This is followed by one pore volume of a 2,000 parts per million polyacrylamide mobility buffer in fresh water and one final pore volume of fresh water driving fluid. Oil recovery from the recovery well is thereby increased as evidenced by a lower ratio of water to oil.

While this invention has been described in detail for the purpose of illustration, it is not to be construed as limited thereby but is intended to cover all changes and modifications within the spirit and scope thereof.

I claim:

1. A process comprising:
   (a) injecting into a subterranean formation having zones of varying permeability a composition which is a debilitating agent for a subsequent injected plug-forming composition;
   (b) thereafter introducing a fluid flush material under conditions so as to selectively remove said debilitating agent from the more permeable zones of said formation; and
   (c) thereafter introducing a said plug-forming composition which in the absence of said debilitating agent provides a fluid diversion composition.

2. A method according to claim 1 wherein said formation having varying zones of permeability is a subterranean oil bearing formation which has been subjected to secondary oil recovery until a ratio of water to oil produced is relatively high as a result of channeling through more permeable zones.

3. A method according to claim 1 wherein said flush is selected from fresh water or water containing 250 to 100,000 parts per million in total dissolved solids.

4. A method according to claim 1 wherein said debilitating agent of (a) is a catalyst poison and said composition of (c) is a monomer composition polymerizable to a viscous polymer as a result of containing a catalyst having a sufficient latent time so that the composition can be injected into the formation before the polymerization occurs to any significant extent.

5. A process according to claim 4 wherein said formation is an oil bearing formation which has been subjected to secondary oil recovery until a ratio of water to oil obtained from producing wells is greater than 100:1 due to channeling, and wherein said flush comprises fresh water or water containing 250 to 100,000 parts per million total dissolved solids.

6. A method according to claim 5 wherein after said monomer has been injected and time elasped for polymerization thereof, a surfactant system is introduced followed by a drive fluid so as to produce additional oil from said producing wells.

7. A method according to claim 6 wherein said surfactant system comprises a petroleum sulfonate, isopropyl alcohol, and a predominantly sodium chloride brine.

8. A method according to claim 6 wherein said surfactant system is followed by a mobility buffer.

9. A method according to claim 8 wherein said poison of (a) is introduced in a fluid composition in an amount of greater than one pore volume and wherein said flush (b) is introduced in an amount of less than one pore volume.

10. A method according to claim 1 wherein said debilitating agent of (a) is introduced in an amount of greater than one pore volume and said flush of (b) is introduced in an amount of less than one pore volume.

11. A process according to claim 1 wherein said debilitating agent of (a) is an acid and said composition of (c) is a material which forms a precipitate in a basic medium.

12. A process according to claim 1 wherein said debilitating agent of (a) is a depolymerization agent and said composition of (c) is a polymer which is broken down by said depolymerization agent.

* * * * *

UNITED STATES PATENT AND TRADEMARK OFFICE
CERTIFICATE OF CORRECTION

PATENT NO. : 4,190,109

DATED : February 26, 1980

INVENTOR(S) : Hugh M. Barton, Jr.

It is certified that error appears in the above–identified patent and that said Letters Patent are hereby corrected as shown below:

Column 4, line 7, delete "a".
line 41, delete "6" and substitute therefor --- 7 ---.

Signed and Sealed this

Fifth Day of August 1980

[SEAL]

Attest:

SIDNEY A. DIAMOND

Attesting Officer

Commissioner of Patents and Trademarks